United States Patent
Huang et al.

(10) Patent No.: US 12,500,413 B2
(45) Date of Patent: Dec. 16, 2025

(54) BOX-TYPE SUBSTATION, ENERGY STORAGE POWER SUPPLY SYSTEM, AND PHOTOVOLTAIC POWER GENERATION SYSTEM

(71) Applicant: Huawei Digital Power Technologies Co., Ltd., Shenzhen (CN)

(72) Inventors: Qiang Huang, Shanghai (CN); Yazhu Zhao, Shanghai (CN); Haiyang Pan, Shanghai (CN); Peng Zhou, Shanghai (CN); Xishan Wang, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/817,537

(22) Filed: Aug. 28, 2024

(65) Prior Publication Data

US 2025/0079828 A1    Mar. 6, 2025

(30) Foreign Application Priority Data

Aug. 28, 2023 (CN) .......................... 202311099027.6

(51) Int. Cl.
| | |
|---|---|
| H02H 11/00 | (2006.01) |
| H02B 1/24 | (2006.01) |
| H02B 1/46 | (2006.01) |
| H02J 3/32 | (2006.01) |
| H02J 3/38 | (2006.01) |
| H02S 40/32 | (2014.01) |

(52) U.S. Cl.
CPC ............ *H02H 11/008* (2013.01); *H02B 1/24* (2013.01); *H02B 1/46* (2013.01); *H02J 3/32* (2013.01); *H02J 3/381* (2013.01); *H02S 40/32* (2014.12); *H02J 2300/24* (2020.01)

(58) Field of Classification Search
CPC ...... H02H 11/00; H02H 11/008; H02S 40/32; H02B 1/24; H02B 1/46; H02J 3/32; H02J 3/38; H02J 3/381; H02J 2300/24
See application file for complete search history.

(56) References Cited

FOREIGN PATENT DOCUMENTS

| | | |
|---|---|---|
| CN | 209591838 U | 11/2019 |
| CN | 210563810 U | 5/2020 |
| CN | 213340146 U | 6/2021 |
| CN | 114038698 A | 2/2022 |

*Primary Examiner* — Robert L Deberadinis
(74) *Attorney, Agent, or Firm* — Maier & Maier, PLLC (57) ABSTRACT

A box-type substation, an energy storage power supply system, and a photovoltaic power generation system. The box-type substation includes a low-voltage cabinet, a high-voltage cabinet, a transformer, a first keychain, and a second keychain. When two circuit breakers in the low-voltage cabinet are in a switched-on state, each of the first keychain and the second keychain is locked at a corresponding circuit breaker. Therefore, when maintenance is performed on the transformer, the circuit breakers in the low-voltage cabinet are switched off first to remove the first keychain and the second keychain. Then, the first keychain and the second keychain are used together to switch off a disconnector in the high-voltage cabinet, and the first keychain and the second keychain are locked at the disconnector when the disconnector is in a switched-off state. Mechanical lock logic of the box-type substation is simple with high efficiency.

18 Claims, 10 Drawing Sheets

BOX-TYPE SUBSTATION, ENERGY STORAGE POWER SUPPLY SYSTEM, AND PHOTOVOLTAIC POWER GENERATION SYSTEM

CROSS-REFERENCE TO RELATED APPLICATION

This application claims priority to Chinese Patent Application No. 202311099027.6, filed on Aug. 28, 2023, which is hereby incorporated by reference in its entirety.

TECHNICAL FIELD

The embodiments relate to the field of energy storage technologies and a box-type substation, an energy storage power supply system, and a photovoltaic power generation system.

BACKGROUND

Box-type substations are widely used in various energy storage scenarios because the box-type substations have advantages such as a small footprint, high mobility, high security and reliability, and easy maintenance.

Currently, to implement safe maintenance of a transformer in the box-type substation, the box-type substation is usually equipped with a set of logic locks. Therefore, a door of a transformer room in which the transformer is located can be opened only after a circuit breaker in a low-voltage cabinet is switched off, a circuit breaker and a disconnector in a high-voltage cabinet are switched off, and a grounding switch in the high-voltage cabinet is switched on. In this way, maintenance personnel can enter the transformer room to perform maintenance on the transformer only when windings in both the low-voltage cabinet and the high-voltage cabinet are powered off. This can effectively ensure safety of the maintenance personnel. However, interlocking logic of the logic locks used for the existing box-type substation is complex. The maintenance personnel need to read an operation guide before performing an operation on the logic locks. This is not conducive to quick maintenance of the transformer in an emergency. Based on this, how to simplify an interlocking design, reduce materials, and save time spent in each phase of interlocking release on a premise of ensuring safety, to effectively improve overall maintenance efficiency of the transformer in the box-type substation becomes a difficult problem to be urgently resolved by a person skilled in the art.

SUMMARY

The embodiments provide a box-type substation, an energy storage power supply system, and a photovoltaic power generation system, to simplify an interlocking design while ensuring maintenance safety of the box-type substation, improve maintenance efficiency of a transformer in the box-type substation, and improve running reliability of an energy storage power supply system and a photovoltaic power generation system for which the box-type substation is used.

According to a first aspect, the embodiments provide a box-type substation. The box-type substation may include a low-voltage cabinet, a high-voltage cabinet, a transformer, a first keychain, and a second keychain. The low-voltage cabinet includes a first circuit breaker and a second circuit breaker, where the first circuit breaker is configured to control connection or disconnection between a low-voltage input of the box-type substation and one low-voltage winding of the transformer, and the second circuit breaker is configured to control connection or disconnection between the low-voltage input of the box-type substation and the other low-voltage winding of the transformer. The first keychain is configured to switch on or switch off the first circuit breaker, and when the first circuit breaker is switched on, the first keychain is locked at the first circuit breaker. In this case, the first keychain cannot be pulled out from the first circuit breaker. The second keychain is configured to switch on or switch off the second circuit breaker, and when the second circuit breaker is switched on, the second keychain is locked at the second circuit breaker. In this case, the second keychain cannot be pulled out from the second circuit breaker. In addition, the high-voltage cabinet includes a disconnector, where the disconnector is configured to control connection or disconnection between a high-voltage winding of the transformer and an output of the box-type substation. When the first circuit breaker and the second circuit breaker are both switched off, the first keychain and the second keychain are configured to simultaneously switch off the disconnector and are both locked at the disconnector. A mechanical lock interlocking structure of the box-type substation provided in the embodiments is simple. In addition, based on mechanical lock logic of the box-type substation provided in the embodiments, maintenance personnel can quickly switch off the first circuit breaker, the second circuit breaker, and the disconnector without using an operation guide. This helps improve maintenance efficiency of the transformer in the box-type substation, and helps save maintenance costs of the box-type substation. In addition, when the first circuit breaker and the second circuit breaker are both switched off, the first keychain and the second keychain are configured to simultaneously switch off the disconnector and are both locked at the disconnector. Therefore, after the first circuit breaker, the second circuit breaker, and the disconnector are switched off, a misoperation of switching on the disconnector can be effectively avoided. This can ensure safety of maintenance personnel.

In a possible implementation of the embodiments, the box-type substation further includes a first door, a second door, a third keychain, and a fourth keychain. The high-voltage cabinet further includes a grounding switch. When the disconnector is switched on, the grounding switch is switched off; and when the disconnector is switched off, the grounding switch is switched on. In addition, when the grounding switch is switched on, the third keychain is configured to open the first door, and the fourth keychain is configured to open the second door. When the first door is in an open state, the third keychain is locked at the first door. When the second door is in an open state, the fourth keychain is locked at the second door. In this way, when the first circuit breaker and the second circuit breaker in the low-voltage cabinet are in a switched-off state, the disconnector in the high-voltage cabinet is in a switched-off state, and the grounding switch is in a switched-on state, the first door and the second door are opened. This can effectively improve maintenance safety of the box-type substation. In addition, when the first door and the second door are in the open state, the third keychain is locked at the first door, and the fourth keychain is locked at the second door. Therefore, in a process of maintenance of the transformer, a misoperation of switching off the grounding switch can be avoided. This can effectively improve maintenance safety of the transformer.

In a possible implementation of the embodiments, the first keychain may include a first key, and the second keychain may include a second key. The first circuit breaker includes a first lock, and when the first circuit breaker is switched on, the first key is locked at the first lock. In this way, when the first circuit breaker is switched on, the first keychain cannot be separated from the first circuit breaker, and thus the first keychain cannot be used to switch off the disconnector. Therefore, a sequence of switching off the first circuit breaker and the disconnector may be limited. This helps improve operation safety in a process of unlocking the box-type substation.

Similarly, the second circuit breaker may include a second lock, and when the second circuit breaker is switched on, the second key is locked at the second lock. In this way, when the second circuit breaker is switched on, the second keychain cannot be separated from the second circuit breaker, and thus the second keychain cannot be used to switch off the disconnector. Therefore, a sequence of switching off the second circuit breaker and the disconnector may be limited. This helps improve operation safety in a process of unlocking the box-type substation.

In a possible implementation of the embodiments, the disconnector includes a third lock and a fourth lock, and when the disconnector is switched off, the first key is locked at the third lock. When the disconnector is switched off, the second key is locked at the fourth lock. In this implementation, only one first key may be disposed in the first keychain, and only one second key may be disposed in the second keychain. In this way, the disconnector can be switched off only after the first circuit breaker and the second circuit breaker are locked in a switched-off state. This can effectively improve operation safety in a process of unlocking the box-type substation. In addition, when the first keychain and the second keychain are used to switch off the disconnector, time for distinguishing and confirming a lock and a key that match each other can be reduced. This can effectively improve unlocking efficiency of the box-type substation.

In a possible implementation of the embodiments, the disconnector includes a third lock and a fourth lock, the first keychain further includes a third key, and the second keychain further includes a fourth key. When the disconnector is switched off, the third key is locked at the third lock. In addition, when the disconnector is switched off, the fourth key is locked at the fourth lock. In this way, when the first circuit breaker and the second circuit breaker are both locked in a switched-off state, the third key and the fourth key may be simultaneously used to switch off the disconnector and lock the disconnector in a switched-off state, to improve maintenance safety of the box-type substation.

In a possible implementation of the embodiments, the third lock and the fourth lock are locks of a same type, and the third key and the fourth key are keys of a same type. In this way, when the first keychain and the second keychain are used to switch off the disconnector, time for distinguishing and confirming the third key and the fourth key can be reduced, so that the first keychain and the second keychain can be quickly connected to the disconnector. This can effectively improve unlocking efficiency of the box-type substation.

In a possible implementation of the embodiments, the first lock and the second lock are locks of a same type, and the first key and the second key are keys of a same type. In this case, the first circuit breaker and the second circuit breaker may be circuit breakers of a same type. This helps simplify a structure of the box-type substation.

In a possible implementation of the embodiments, the third keychain includes a fifth key, and the fourth keychain includes a sixth key. The grounding switch includes a fifth lock and a sixth lock, and when the grounding switch is switched off, the fifth key is locked at the fifth lock, and the sixth key is locked at the sixth lock, so that the third keychain and the fourth keychain are connected to the grounding switch.

In a possible implementation of the embodiments, the first door includes a seventh lock, the second door includes an eighth lock, and when the grounding switch is switched on, the fifth key is configured to open the first door, and the sixth key is configured to open the second door. When the first door is opened, the fifth key is locked at the seventh lock; and when the second door is opened, the sixth key is locked at the eighth lock. In this implementation, only one fifth key may be disposed in the third keychain, and only one sixth key may be disposed in the fourth keychain. In this way, the first door and the second door can be opened only when the grounding switch is in a switched-on state. This can effectively improve operation safety in a process of unlocking the box-type substation. In addition, when the fifth key is used to open the first door, and the sixth key is used to open the second door, time for distinguishing and confirming a lock and a key that match each other can be reduced. This can effectively improve unlocking efficiency of the box-type substation.

In a possible implementation of the embodiments, the first door includes a seventh lock, the second door includes an eighth lock, the third keychain further includes a seventh key, and the fourth keychain further includes an eighth key. When the grounding switch is switched on, the seventh key is configured to open the first door, and the eighth key is configured to open the second door. In this way, after the third keychain and the fourth keychain are pulled out from the grounding switch, the third keychain and the fourth keychain may be carried to open the first door and the second door respectively, to implement maintenance of the box-type substation.

In a possible implementation of the embodiments, the seventh lock and the eighth lock are locks of a same type, and the seventh key and the eighth key are keys of a same type. In this way, when the third keychain and the fourth keychain are used to open the first door and the second door respectively, time for distinguishing and confirming the seventh key and the eighth key can be reduced, so that the first door and the second door can be quickly opened.

In a possible implementation of the embodiments, the fifth lock and the sixth lock are locks of a same type, and the fifth key and the sixth key are keys of a same type. That is, the grounding switch may be provided with two locks of a same type. This helps simplify a structure of the box-type substation.

In a possible implementation of the embodiments, in a process of re-locking the box-type substation whose maintenance is completed, the grounding switch can be switched off only when the fifth key is locked at the fifth lock and the sixth key is locked at the sixth lock, to ensure that the two doors of the transformer room are both in a closed state when the grounding switch is switched off. This improves operation safety in a process of locking the box-type substation.

According to a second aspect, the embodiments further provide an energy storage power supply system. The energy storage power supply system includes an energy storage apparatus, an energy storage converter, and the box-type substation provided in the first aspect, where the energy storage converter is configured to: convert a direct current output by the energy storage apparatus into an alternating current and output the alternating current to the box-type substation; or convert an alternating current input by the box-type substation into a direct current and input the direct current to the energy storage apparatus. The box-type substation is configured to: perform voltage boosting processing on the alternating current output by the energy storage converter, and then output an alternating current obtained through voltage boosting processing to a power grid; or perform voltage decreasing processing on an alternating current input by a power grid, and then input an alternating current obtained through voltage decreasing processing to the energy storage converter. Because the box-type substation provided in the first aspect of the embodiments can effectively improve maintenance efficiency of the box-type substation while ensuring safety of maintenance personnel, the box-type substation helps improve running reliability of the energy storage system for which the box-type substation is used.

According to a third aspect, the embodiments further provide a photovoltaic power generation system, where the photovoltaic power generation system includes an inverter and the box-type substation provided in the first aspect. The inverter is configured to: convert a received direct current into an alternating current and output the alternating current to the box-type substation, and the box-type substation is configured to: perform voltage boosting processing on the alternating current output by the inverter and output an alternating current obtained through voltage boosting processing to a power grid. Because the box-type substation provided in the first aspect of the embodiments can effectively improve maintenance efficiency of the box-type substation while ensuring safety of maintenance personnel, the box-type substation helps improve running reliability of the photovoltaic power generation system for which the box-type substation is used.

DETAILED DESCRIPTION OF EMBODIMENTS

To make objectives, solutions, and advantages of the embodiments clearer, the following further describes embodiments in detail with reference to the accompanying drawings. However, the examples of implementations can be implemented in a plurality of forms, and should not be construed as being limited to the implementations described herein. The same reference numerals in the accompanying drawings represent the same or similar structures, and repeated descriptions thereof are omitted. Words for expressing positions and directions in embodiments are described by using the accompanying drawings as examples. However, changes may be made as required, and all changes shall fall within the scope of the embodiments. The accompanying drawings in embodiments are merely used to show a relative positional relationship, and do not represent a true scale.

It should be noted that specific details are elaborated in the following descriptions for ease of fully understanding the embodiments. However, embodiments can be implemented in a plurality of manners different from those described herein, and a person skilled in the art can perform similar promotion without departing from the connotation of embodiments of the embodiments. Therefore, the embodiments are not limited to the following specific implementations.

Figure 1:
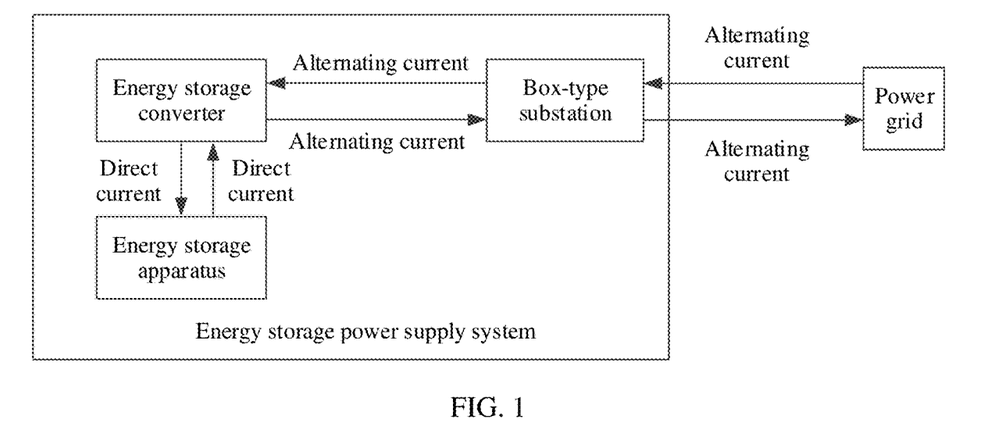
FIG. 1 is a block diagram of a structure of an energy storage power supply system according to an embodiment.

For ease of understanding a box-type substation provided in an embodiment, an application scenario of the box-type substation is first described as follows. The box-type substation provided in this embodiment may be used in an energy storage power supply system such as a household energy storage system, an industrial and commercial energy storage system, or a power station. FIG. 1 is a block diagram of a structure of an energy storage power supply system according to an embodiment. The energy storage power supply system can further include an energy storage converter and an energy storage apparatus. The energy storage converter may be configured to: convert a direct current output by the energy storage apparatus into an alternating current and output the alternating current to the box-type substation; or convert an alternating current input by the box-type substation into a direct current and input the direct current to the energy storage apparatus. The box-type substation may be configured to: perform voltage boosting processing on the alternating current output by the energy storage converter, and then output an alternating current obtained through voltage boosting processing to a power grid; or perform voltage decreasing processing on an alternating current input by a power grid, and then input an alternating current obtained through voltage decreasing processing to the energy storage converter.

Figure 2:
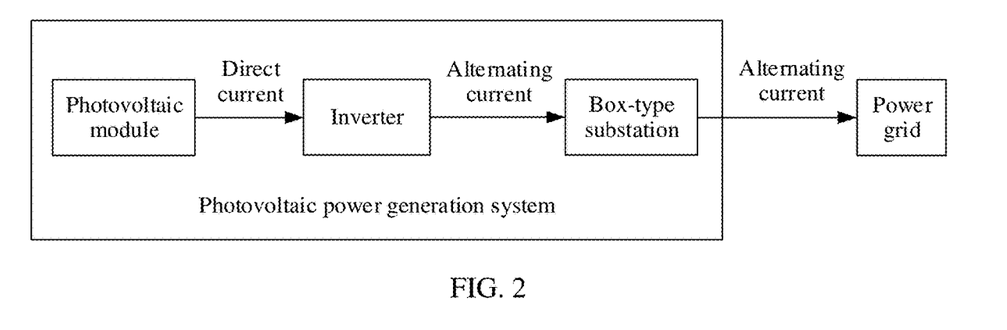
FIG. 2 is a block diagram of a structure of a photovoltaic power generation system according to an embodiment.

In addition, the box-type substation provided in this embodiment may be further used in a photovoltaic power generation system. FIG. 2 is a block diagram of a structure of a photovoltaic power generation system according to an embodiment. An inverter of the photovoltaic power generation system may be configured to: convert a direct current that is received by the inverter and that is from a photovoltaic module into an alternating current, and output the alternating current to the box-type substation. The box-type substation may be configured to: perform voltage boosting processing on the alternating current output by the inverter and output an alternating current obtained through voltage boosting processing to a power grid, to implement grid connection of the photovoltaic power generation system.

Figure 3:
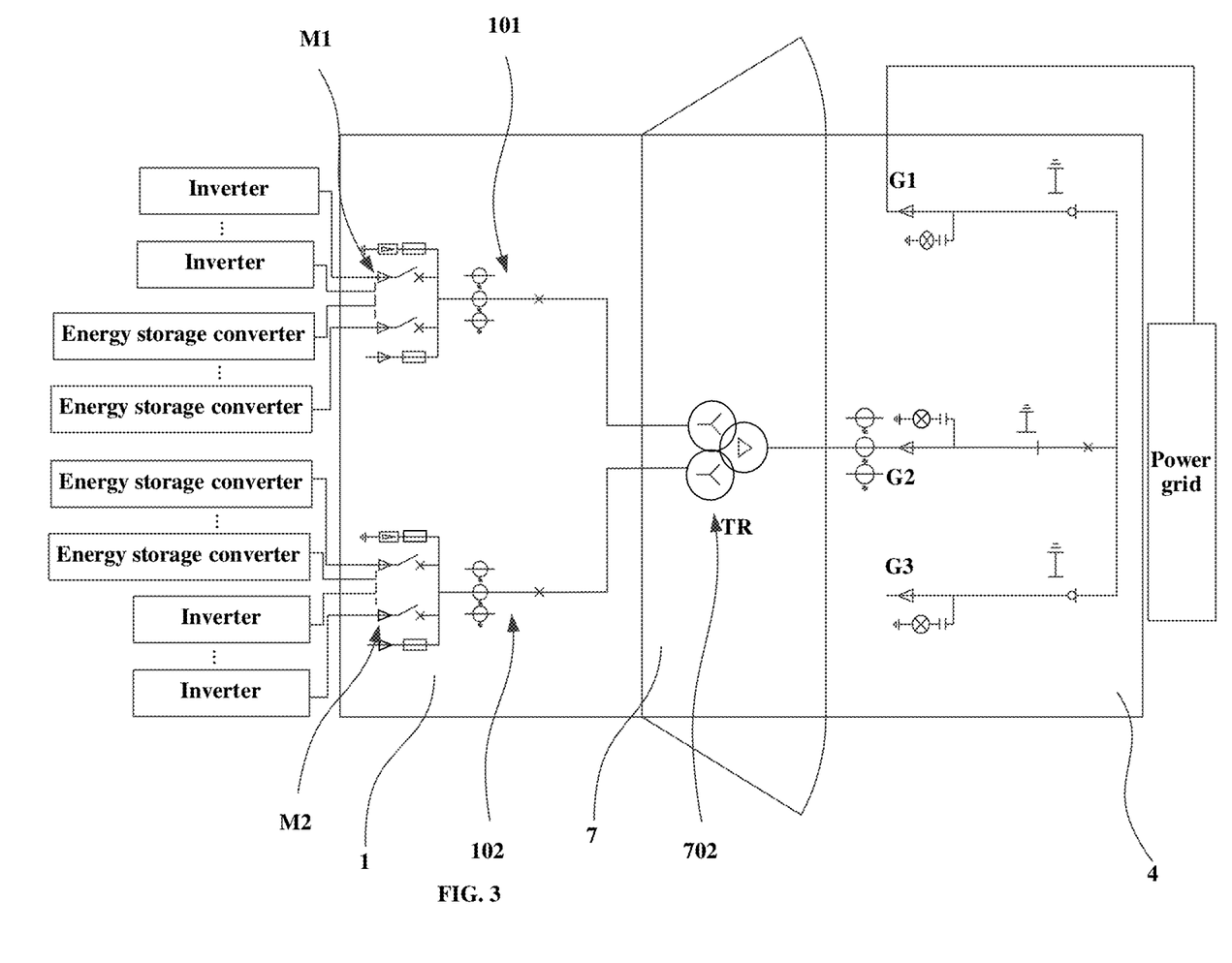
FIG. 3 is a schematic of a specific application scenario of a box-type substation according to an embodiment.

FIG. 3 is a schematic of a specific application scenario of a box-type substation according to an embodiment. The box-type substation includes a low-voltage cabinet 1, a high-voltage cabinet 4, and a transformer room 7. The transformer room 7 includes a transformer 702, and the transformer 702 includes two low-voltage windings and one high-voltage winding. The low-voltage cabinet 1 includes a first circuit breaker 101 and a second circuit breaker 102, where one end of the first circuit breaker 101 is electrically connected to one of the low-voltage windings of the transformer 702, the other end of the first circuit breaker 101 is connected to a plurality of molded case circuit breakers M1, one end of the second circuit breaker 102 is electrically connected to the other of the low-voltage windings of the transformer 702, and the other end of the second circuit breaker 102 is connected to a plurality of molded case circuit breakers M2. At least one molded case circuit breaker M1 connected to the first circuit breaker 101 may be configured to electrically connect to an energy storage converter, and at least one molded case circuit breaker M2 connected to the second circuit breaker 102 may be configured to electrically connect to an energy storage converter, to connect the box-type substation to an energy storage power supply system. In addition, the at least one molded case circuit breaker M1 connected to the first circuit breaker 101 may be configured to electrically connect to an inverter, and the at least one molded case circuit breaker M2 connected to the second circuit breaker 102 may be configured to electrically connect to an inverter, to connect the box-type substation to a photovoltaic power generation system.

In addition, the high-voltage cabinet 4 includes a load switch cabinet G1, a circuit breaker cabinet G2, and a load switch cabinet G3, where the circuit breaker cabinet G2 is electrically connected to the high-voltage winding of the transformer 702, and the load switch cabinet G1 is configured to electrically connect to a power grid, to connect the box-type substation to the power grid. When the energy storage power supply system or the photovoltaic power generation system includes a plurality of box-type substations, a load switch cabinet G3 of an upper-level box-type substation is configured to electrically connect to a load switch cabinet G1 of a lower-level box-type substation, so that the plurality of box-type substations are connected in series and then connected to the power grid.

The transformer is an important component of the box-type substation to implement a function of the box-type substation. When the transformer of the box-type substation runs abnormally, a door of a transformer room of the box-type substation needs to be opened, to facilitate maintenance of the transformer. Currently, to implement safe maintenance of the transformer, the box-type substation can be equipped with a logic mechanical lock solution, to ensure safety of maintenance personnel. The box-type substation may include a low-voltage cabinet, a high-voltage cabinet, and a transformer room, where the low-voltage cabinet includes two circuit breakers, the high-voltage cabinet includes a disconnector and a grounding switch, and the transformer is disposed in the transformer room. The two circuit breakers in the low-voltage cabinet, and the disconnector and the grounding switch in the high-voltage cabinet are all electrically connected to the transformer. Based on this, it may be understood that during maintenance of the transformer, to ensure safety of maintenance personnel, the two circuit breakers and the disconnector need to be switched off first, and the grounding switch is in a grounded state.

In a current logic mechanical lock solution used by the box-type substation, a key exchange box can be disposed in each of the low-voltage cabinet and the high-voltage cabinet. In this way, after each of the two circuit breakers in the low-voltage cabinet is switched off, keys on the two circuit breakers may be pulled out, and the two circuit breakers are locked to switched-off locations. In addition, the keys of the two circuit breakers may unlock a disconnector key in the key exchange box in the low-voltage cabinet, so that the disconnector key may be pulled out and the high-voltage cabinet may be accessed to unlock the disconnector in the high-voltage cabinet, to implement a switching-off operation of the disconnector in the high-voltage cabinet. In this case, the disconnector key is inseparably connected to the disconnector. After the foregoing operation of switching off the circuit breaker and the disconnector is completed, the grounding switch electrically connected to the transformer room may be switched on, so that a key at the grounding switch may be pulled out, where the key may be configured to unlock two door keys in the key exchange box of the high-voltage cabinet. After the two door keys are pulled out, each of the two doors may be unlocked, so that the two doors are opened. In this case, maintenance personnel may enter the transformer room to perform maintenance on the transformer. In this way, the key exchange box may perform interlocking interaction with the mechanical lock on the transformer room, so that maintenance personnel can enter the transformer room to perform maintenance on the transformer only when windings in both the low-voltage cabinet and the high-voltage cabinet are powered off. This can effectively ensure safety of maintenance personnel.

It can be understood from the foregoing descriptions of the current process of unlocking the box-type substation that an interlocking structure of the box-type substation is complex. As a result, an unlocking operation of the box-type substation is complex, and maintenance personnel need to read an operation guide before performing an operation. When an emergency occurs, the unlocking operation takes a long time. This greatly affects maintenance efficiency of the transformer.

In view of this, an embodiment provides a box-type substation. An interlocking structure design is simplified, to improve maintenance efficiency of the box-type substation while ensuring maintenance safety of the box-type substation, and improve running reliability of an energy storage system, a photovoltaic power generation system, and the like for which the box-type substation is used. The following describes the box-type substation provided in embodiments with reference to the accompanying drawings.

Figure 4:
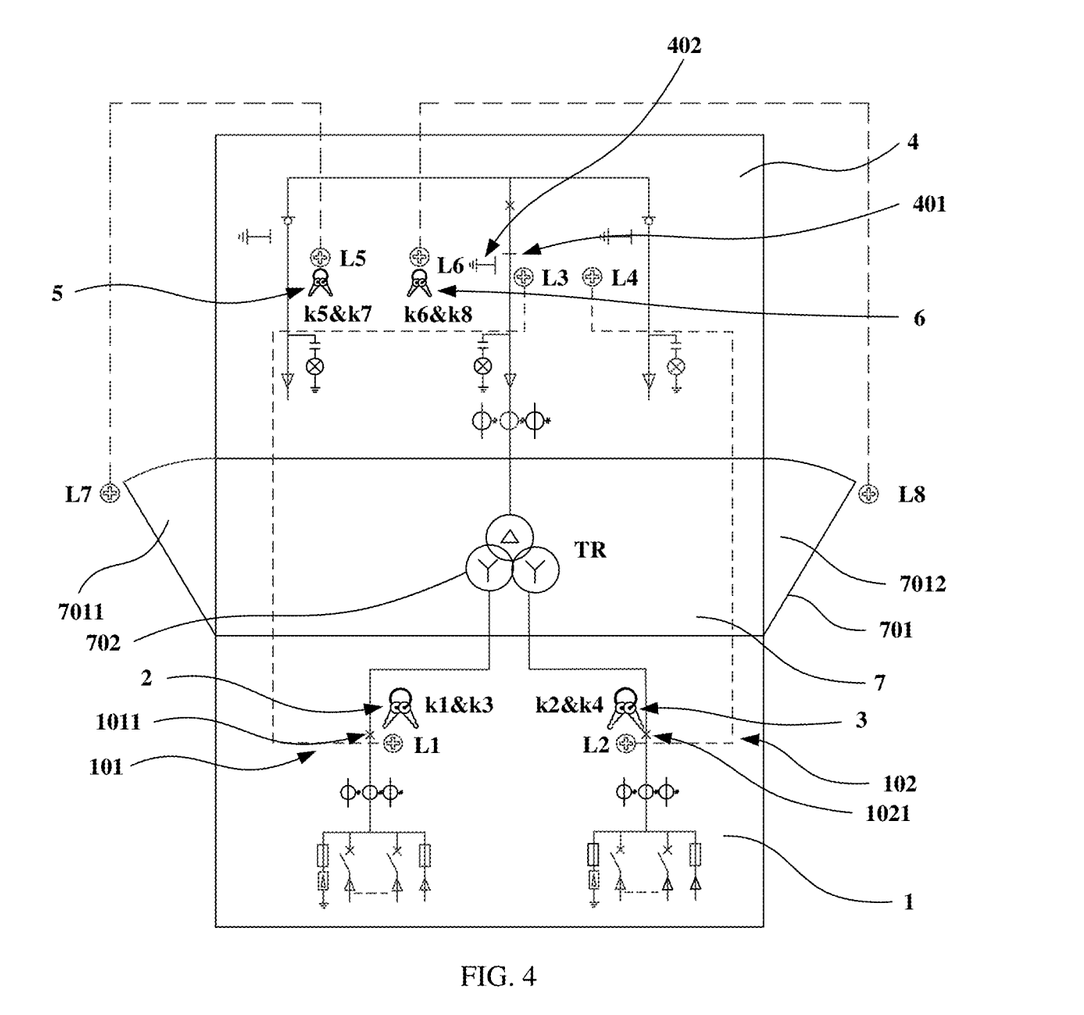
FIG. 4 is a schematic of a structure of a box-type substation according to an embodiment.

FIG. 4 is a schematic of a structure of a box-type substation according to an embodiment. In this embodiment, the box-type substation includes a low-voltage cabinet 1, a first keychain 2, and a second keychain 3. The low-voltage cabinet 1 includes a first circuit breaker 101 and a second circuit breaker 102. The first keychain 2 is configured to switch on or switch off the first circuit breaker 101, and the second keychain 3 is configured to switch on or switch off the second circuit breaker 102. In the box-type substation shown in FIG. 4, the first circuit breaker 101 is in a switched-on state. In this case, the first keychain 2 is locked at the first circuit breaker 101, and the first keychain 2 cannot be pulled out from the first circuit breaker 101. In addition, the second circuit breaker 102 is in a switched-on state, the second keychain 3 is locked at the second circuit breaker 102, and the second keychain 3 cannot be pulled out from the second circuit breaker 102.

In this embodiment, the first circuit breaker 101 may include a first switch-off switch 1011 and a first lock L1, and that the first circuit breaker 101 is in a switched-on state may be understood as that the first switch-off switch 1011 is in a switched-on state. In addition, the first keychain 2 may include a first key k1 and a third key k3, where the first key k1 matches the first lock L1, and when the first switch-off switch 1011 is switched on, the first key k1 is locked at the first lock L1.

The second circuit breaker 102 may include a second switch-off switch 1021 and a second lock L2, and that the second circuit breaker 102 is in a switched-on state may be understood as that the second switch-off switch 1021 is in a switched-on state. The second keychain 3 may include a second key k2 and a fourth key k4. When the second switch-off switch 1021 is switched on, the second key k2 is locked at the second lock L2.

Still refer to FIG. 4. The box-type substation further includes a high-voltage cabinet 4, and the high-voltage cabinet 4 includes a disconnector 401. In the box-type substation shown in FIG. 4, the disconnector 401 is in a switched-on state.

In the box-type substation provided in this embodiment, when the first circuit breaker 101 and the second circuit breaker 102 are both switched off, the first keychain 2 and the second keychain 3 are configured to simultaneously switch off the disconnector 401 and are both locked at the disconnector 401. During specific implementation, the disconnector 401 includes a third lock L3 and a fourth lock L4, and the third key k3 matches the third lock L3, that is, when the first circuit breaker 101 and the second circuit breaker 102 are both switched off, the third key k3 may be configured to connect to the third lock L3. In addition, if the fourth key k4 matches the fourth lock L4, the fourth key k4 may be configured to connect to the fourth lock LA. Therefore, when the third key k3 is connected to the third lock L3, and the fourth key k4 is connected to the fourth lock L4, the third key k3 and the fourth key k4 may be simultaneously used to switch off the disconnector 401, and after the disconnector 401 is switched off, the third key k3 is locked at the third lock L3, and the fourth key k4 is locked at the fourth lock L4.

The box-type substation may further include a third keychain 5 and a fourth keychain 6, and the high-voltage cabinet 4 further includes a grounding switch 402. When the box-type substation is in the state shown in FIG. 4, the disconnector 401 is in a switched-on state, and the grounding switch 402 is in a switched-off state. In this case, the third keychain 5 is locked at the grounding switch 402, and the fourth keychain 6 is locked at the grounding switch 402. In this case, the third keychain 5 and the fourth keychain 6 cannot be pulled out from the grounding switch 402.

In this embodiment, the grounding switch 402 may include a fifth lock L5 and a sixth lock L6. In addition, the third keychain 5 includes a fifth key k5 and a seventh key k7, and the fourth keychain 6 includes a sixth key k6 and an eighth key k8, where the fifth key k5 matches the fifth lock L5, the sixth key k6 matches the sixth lock L6, and when the grounding switch 402 is in the switched-off state shown in FIG. 4, the fifth key k5 is locked at the fifth lock L5, and the sixth key k6 is locked at the sixth lock L6. Therefore, when the grounding switch 402 is in the switched-off state, the fifth key k5 and the sixth key k6 cannot be pulled out from the grounding switch 402, that is, the third keychain 5 and the fourth keychain 6 cannot be pulled out from the grounding switch 402.

It should be noted that in the box-type substation provided in this embodiment, there may be an interlocking relationship between switching-on and switching-off of the disconnector 401 and the grounding switch 402. For example, when the disconnector 401 is switched on, the grounding switch 402 is switched off; and when the disconnector 401 is switched off, the grounding switch 402 is switched on.

This helps simplify interlocking logic of the box-type substation, and helps improve maintenance efficiency of the box-type substation.

Still refer to FIG. 4. The box-type substation further includes a transformer room 7, where the transformer room 7 includes a cabinet body 701 and a transformer 702, and the transformer 702 is accommodated in the cabinet body 701. The first circuit breaker 101 is electrically connected to one low-voltage winding of the transformer 702, and the first circuit breaker 101 is configured to control connection or disconnection between a low-voltage input of the box-type substation and one low-voltage winding of the transformer 702. The second circuit breaker 102 is electrically connected to the other low-voltage winding of the transformer 702, and the second circuit breaker 102 is configured to control connection or disconnection between the low-voltage input of the box-type substation and the other low-voltage winding of the transformer 702. In addition, the disconnector 401 is electrically connected to a high-voltage winding of the transformer 702, and the disconnector 401 is configured to control connection or disconnection between the high-voltage winding of the transformer 702 and a high-voltage output of the box-type substation.

The cabinet body 701 of the transformer room 7 includes a first door 7011 and a second door 7012. In a state shown in FIG. 4, both the first door 7011 and the second door 7012 of the transformer room 7 are in a closed state. When the grounding switch 402 is switched on, the third keychain 5 may be configured to open the first door 7011, and the fourth keychain 6 may be configured to open the second door 7012. In addition, when the first door 7011 is in an open state, the third keychain 5 is locked at the first door; and when the second door 7012 is in an open state, the fourth keychain 6 is locked at the second door 7012. During specific implementation, the first door 7011 includes a seventh lock L7, and the second door 7012 includes an eighth lock L8. In this way, the seventh key k7 matches the seventh lock L7, and the eighth key k8 matches the eighth lock L8. Therefore, in this embodiment, when the grounding switch 402 is switched on, the seventh key k7 may be configured to connect to the seventh lock L7 and be configured to open the first door 7011, and when the first door 7011 is in an open state, the seventh key k7 is locked at the seventh lock L7. In addition, when the grounding switch 402 is switched on, the eighth key k8 may be configured to connect to the eighth lock L8 and be configured to open the second door 7012, and when the second door 7012 is opened, the eighth key k8 is locked at the eighth lock L8.

After the structure of the box-type substation provided in the foregoing embodiments is understood, the following describes an unlocking operation process of the box-type substation.

Step 1: Switch off the first circuit breaker 101 and the second circuit breaker 102. Refer to FIG. 4. When the first circuit breaker 101 is switched off, the first key k1 may be rotated and the first key k1 may be pulled out from the first lock L1, so that the first keychain 2 is separated from the first circuit breaker 101. In addition, when the first keychain 2 is separated from the first circuit breaker 101, the first circuit breaker 101 may be further locked in a switched-off state. Similarly, when the second circuit breaker 102 is switched off, the second key k2 may be rotated and the second key k2 may be pulled out from the second lock L2, so that the second keychain 3 is separated from the second circuit breaker 102. In addition, when the second keychain 3 is separated from the second circuit breaker 102, the second circuit breaker 102 may be further locked in a switched-off state.

Figure 5:
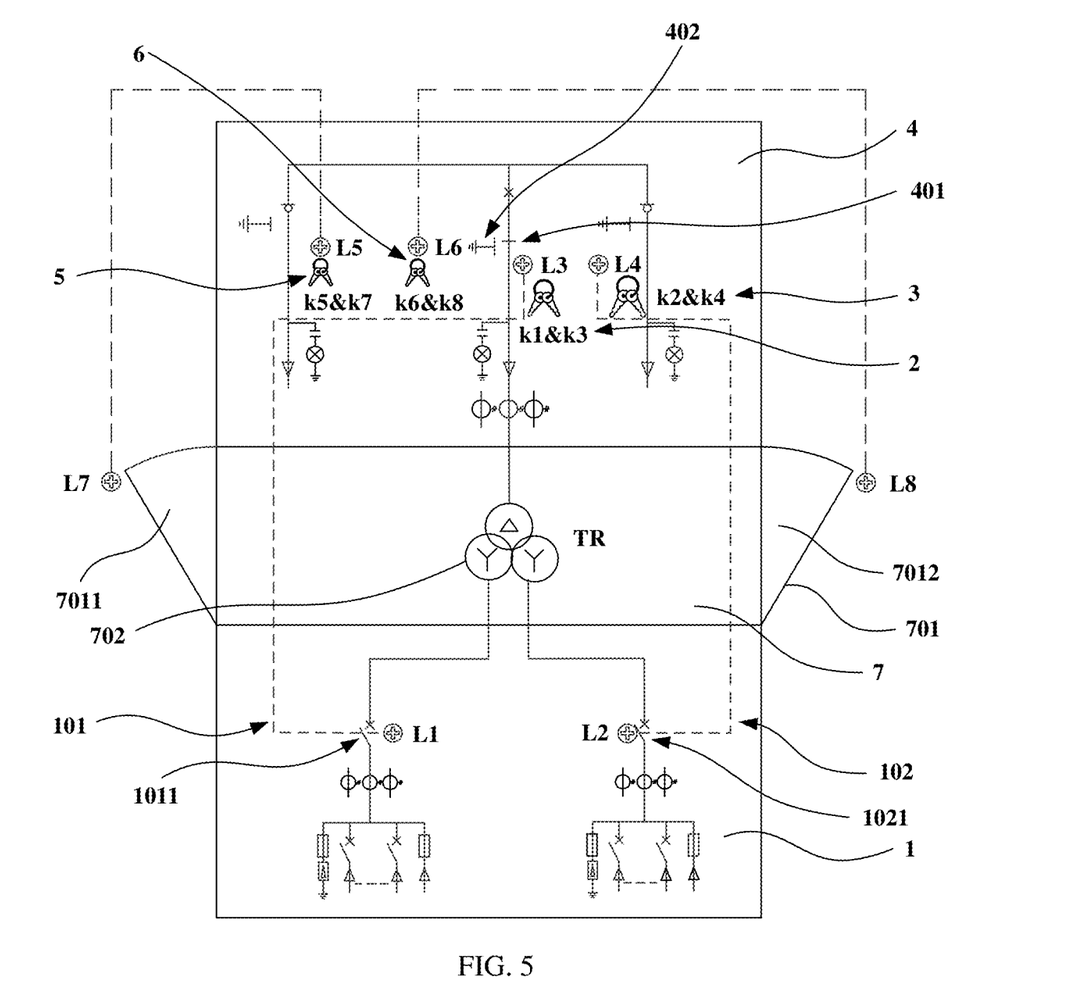
FIG. 5 is another schematic of a structure of a box-type substation according to an embodiment.

After the operation in step 1 is completed, the box-type substation is in a state shown in FIG. 5. FIG. 5 is another schematic of a structure of the box-type substation according to an embodiment. As shown in FIG. 5, after the first keychain 2 and the second keychain 3 are pulled out from the corresponding circuit breakers, an operation in step 2 may be performed, that is, the first keychain 2 and the second keychain 3 are carried to the high-voltage cabinet 4 to unlock the disconnector 401. During specific implementation, the third key k3 may be inserted into the third lock L3 of the disconnector 401 and the third key k3 may be rotated. At the same time, the fourth key k4 is inserted into the fourth lock LA of the disconnector 401 and the fourth key k4 is rotated, to switch off the disconnector 401. It should be noted that in this embodiment, when the disconnector 401 is switched off, the third key k3 is locked at the third lock L3, and the fourth key k4 is locked at the fourth lock L4, so that the third keychain 5 and the fourth keychain 6 are locked at the disconnector 401. This can effectively avoid loss of the third keychain 5 and the fourth keychain 6.

It should be noted that in this embodiment, the disconnector 401 can be switched off only when the third key k3 is inserted into the third lock L3 and the fourth key k4 is inserted into the fourth lock L4. In this way, it can be effectively ensured that a switching-off operation can be performed on the disconnector 401 only when the two circuit breakers in the low-voltage cabinet 1 are both in a switched-off state. This can effectively improve operation safety in a maintenance process of the box-type substation.

Figure 6:
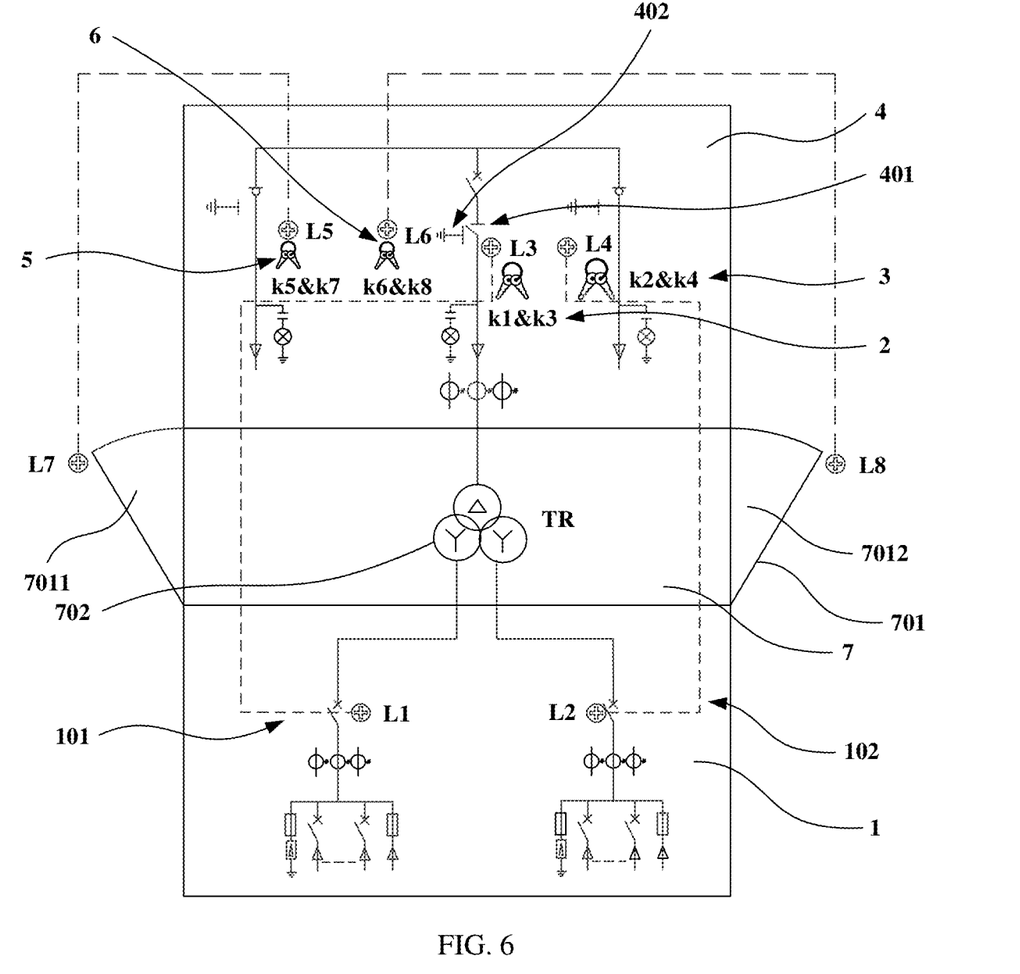
FIG. 6 is another schematic of a structure of a box-type substation according to an embodiment.

After the operation in step 2 is completed, the box-type substation is in a state shown in FIG. 6. FIG. 6 is another schematic of a structure of the box-type substation according to an embodiment. In the state shown in FIG. 6, an operation in step 3 may be performed. For example, the grounding switch 402 may be switched on. Therefore, when the disconnector 401 is locked in a switched-off state and the grounding switch 402 is in a switched-on state, the fifth key k5 may be rotated, the fifth key k5 may be pulled out from the fifth lock L5, and the sixth key k6 may be rotated to pull out the sixth key k6 from the sixth lock L6, so that the third keychain 5 and the fourth keychain 6 are separated from the grounding switch 402.

Figure 7:
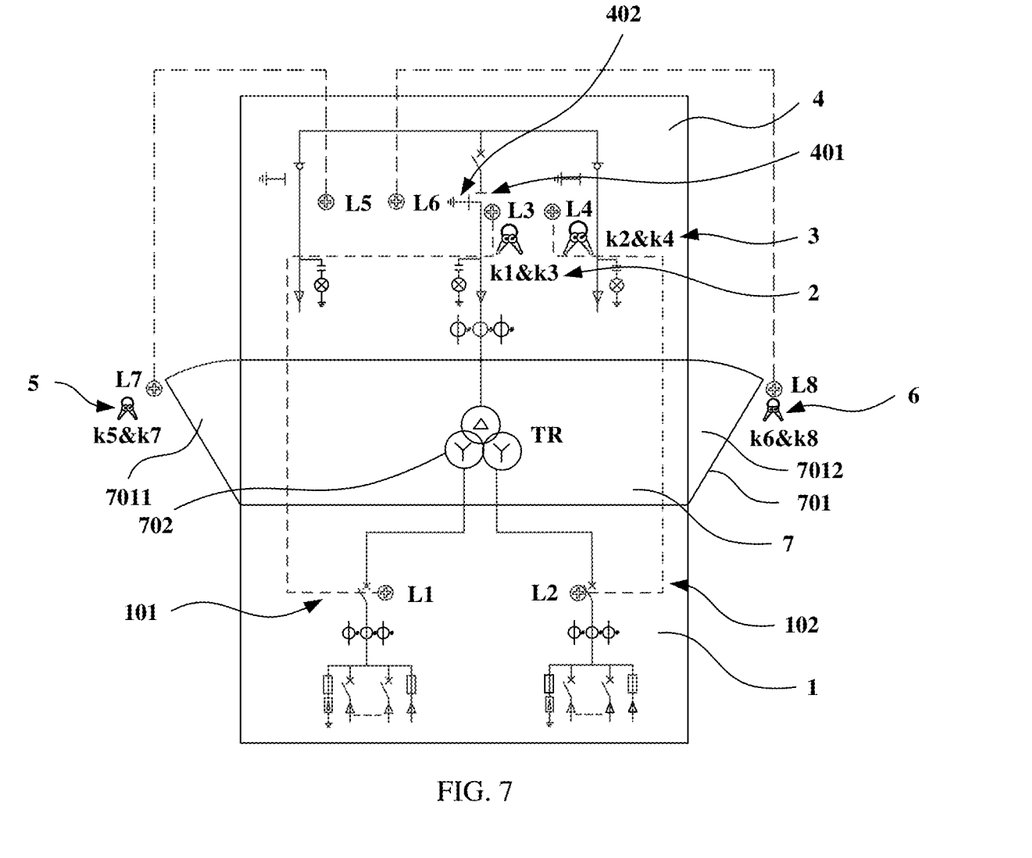
FIG. 7 is another schematic of a structure of a box-type substation according to an embodiment.

After the third keychain 5 and the fourth keychain 6 are pulled out from the grounding switch 402, the grounding switch 402 may be locked in a switched-on state. In this case, the third keychain 5 and the fourth keychain 6 may be carried to the transformer room 7, to perform an operation in step 4. For example, FIG. 7 is another schematic of a structure of the box-type substation according to an embodiment. When the box-type substation is in a state shown in FIG. 7, the disconnector 401 is locked in a switched-off state and the grounding switch 402 is in a switched-on state. Therefore, each winding in the low-voltage cabinet 1 and the high-voltage cabinet 4 is in a power-off state, and the transformer 702 in the transformer room 7 is not energized. In this case, the third keychain 5 may be configured to open the first door 7011, and the fourth keychain 6 may be configured to open the second door 7012. During specific implementation, the seventh lock L7 may be unlocked by using the seventh key k7, and the eighth lock L8 may be unlocked by using the eighth key k8, so that the first door 7011 and the second door 7012 of the transformer room 7 may be opened, and maintenance personnel may perform maintenance on the transformer 702 located in the cabinet body 701 of the transformer room 7. This can effectively ensure safety of maintenance personnel. In addition, when the first door 7011 is in an open state, the third keychain 5 is locked at the first door 7011; and when the second door 7012 is in an open state, the fourth keychain 6 is locked at the second door 7012. In this way, in a process in which maintenance personnel perform maintenance on the transformer 702, a misoperation of switching off the grounding switch 402 by using the third keychain 5 and the fourth keychain 6 can be avoided. This can improve maintenance safety of the box-type substation.

It should be noted that in the box-type substation provided in this embodiment, opening of the first door 7011 and opening of the second door 7012 do not depend on each other. Therefore, in an actual maintenance process of the box-type substation, only the first door 7011, only the second door 7012, or both the first door 7011 and the second door 7012 may be opened based on a specific maintenance requirement.

In addition, in the embodiments, the first door 7011 may be set to be in a single-door form or a double-door form. For example, when the first door 7011 is set to be in a single-door form, only one seventh lock L7 may be provided for the first door 7011. In this case, the first door 7011 can be opened by using one seventh key k7. When the first door 7011 is set to be in a double-door form, it may be understood that the first door 7011 includes two doors. In this case, each door may be provided with a seventh lock L7. Therefore, when the first door 7011 is opened, the two seventh locks L7 need to be unlocked separately. In addition, when the first door 7011 is set to be in a double-door form, types of locks of the two doors of the first door 7011 may alternatively be different, and a key configured to unlock the locks of the two doors may be connected to the fifth key k5 to form the third keychain 5.

Similarly, the second door 7012 may be set in a single-door form or a double-door form. For example, when the second door 7012 is set in a single-door form, only one eighth lock L8 may be provided for the second door 7012. In this case, the second door 7012 can be opened by using one eighth lock L8. When the second door 7012 is set to be in a double-door form, it may be understood that the second door 7012 includes two doors. In this case, each door may be provided with an eighth lock L8. Therefore, when the second door 7012 is opened, the two eighth locks L8 need to be unlocked separately. In addition, when the second door 7012 is set to be in a double-door form, types of locks of the two doors of the second door 7012 may alternatively be different, and a key configured to unlock the locks of the two doors may be connected to the sixth key k6 to form the fourth keychain 6.

In addition, after maintenance personnel complete maintenance of the transformer 702, the box-type substation may be re-locked through steps opposite to the foregoing operation steps. It should be noted that in a process of re-locking the box-type substation, the grounding switch 402 can be switched off only when the fifth key k5 is locked at the fifth lock L5 and the sixth key k6 is locked at the sixth lock L6, to ensure that the two doors of the transformer room 7 are both in a closed state when the grounding switch 402 is switched off. This improves operation safety in a process of locking the box-type substation.

In the box-type substation provided in this embodiment, mechanical lock logic between the low-voltage cabinet 1, the high-voltage cabinet 4, and the transformer room 7 is simple. In a maintenance process of the transformer 702, the door of the transformer room 7 can be unlocked only after the circuit breaker in the low-voltage cabinet 1 is first switched off, the disconnector 401 in the high-voltage cabinet 4 is switched off, and then the grounding switch 402 is switched on. Based on understanding of the operation steps, without using an operation guide, maintenance personnel of the box-type substation can quickly complete unlocking of the box-type substation and perform maintenance on the transformer 702. This can effectively improve maintenance efficiency of the transformer 702 while ensuring safety of maintenance personnel, and helps reduce maintenance costs of the box-type substation.

Based on the foregoing descriptions of the structure of the box-type substation and the unlocking and locking processes in the embodiments, it may be understood that, in this embodiment, selection may be performed on types of each lock and a corresponding key, to further simplify the structure of the box-type substation. For example, the first lock L1 and the second lock L2 may be locks of a same type. In this case, the first key k1 and the second key k2 are keys of a same type, and the first circuit breaker 101 and the second circuit breaker 102 may be selected to be circuit breakers of a same type. In addition, the third lock L3 and the fourth lock L4 may be locks of a same type, and the third key k3 and the fourth key k4 may be keys of a same type. In this way, when the first keychain 2 and the second keychain 3 are carried to the high-voltage cabinet 4 to unlock the disconnector 401, the third key k3 and the fourth key k4 do not need to be distinguished. This can reduce time for distinguishing and confirming the third key k3 and the fourth key k4.

Alternatively, the first lock L1 and the third lock L3 may be locks of a same type, and the first key k1 and the third key k3 are keys of a same type. In this case, the first key k1 and the third key k3 may be shared, and the first keychain 2 may include only one key. Similarly, the second lock L2 and the fourth lock L4 may also be locks of a same type. In this case, the second key k2 and the fourth key k4 are keys of a same type, and the second keychain 3 may include only one key. In this way, when the first keychain 2 and the second keychain 3 are used to switch off the disconnector 401 in the high-voltage cabinet 4, the first key k1 may be locked at the third lock L3, and the second key k2 may be locked at the fourth lock L4. Therefore, it can be ensured that the disconnector 401 can be switched off only after the first circuit breaker 101 and the second circuit breaker 102 are locked in a switched-off state. This can effectively improve operation safety in a process of unlocking the box-type substation. In addition, when the first keychain 2 and the second keychain 3 are used to switch off the disconnector 401, time for distinguishing and confirming a lock and a key that match each other can be reduced. This can effectively improve unlocking efficiency of the box-type substation.

In a possible embodiment, the fifth lock L5 and the sixth lock L6 may further be locks of a same type, and the fifth key k5 and the sixth key k6 are keys of a same type. In addition, the seventh lock L7 and the eighth lock L8 may be locks of a same type, and the seventh key k7 and the eighth key k8 are keys of a same type. In this way, when the third keychain 5 and the fourth keychain 6 are carried to the transformer room 7 to unlock the first door 7011 and the second door 7012, the seventh key k7 and the eighth key k8 do not need to be distinguished and the first door 7011 and the second door 7012 can be quickly opened. This can reduce time for distinguishing and confirming the seventh key k7 and the eighth key k8.

Alternatively, the fifth lock L5 and the seventh lock L7 may be locks of a same type, and the fifth key k5 and the seventh key k7 are keys of a same type. In this case, the fifth key k5 and the seventh key k7 may be shared, and the third keychain 5 may include only one key. Similarly, the sixth lock L6 and the eighth lock L8 are locks of a same type. In this case, the sixth key k6 and the eighth key k8 are keys of a same type, and the fourth keychain 6 may include only one key. In this way, when the disconnector 401 is locked in a switched-off state and the grounding switch 402 is in a switched-on state, the fifth key k5 may be configured to open the first door 7011, and the sixth key k6 is configured to open the second door 7012. In this way, it can be ensured that the first door 7011 and the second door 7012 can be opened only when the grounding switch 402 is in a switched-on state. This can effectively improve operation safety in a process of unlocking the box-type substation. In addition, when the third keychain 5 is used to open the first door 7011, and the fourth keychain 6 is used to open the second door 7012, time for distinguishing and confirming a lock and a key that match each other can be reduced. This can effectively improve unlocking efficiency of the box-type substation.

Figure 8:
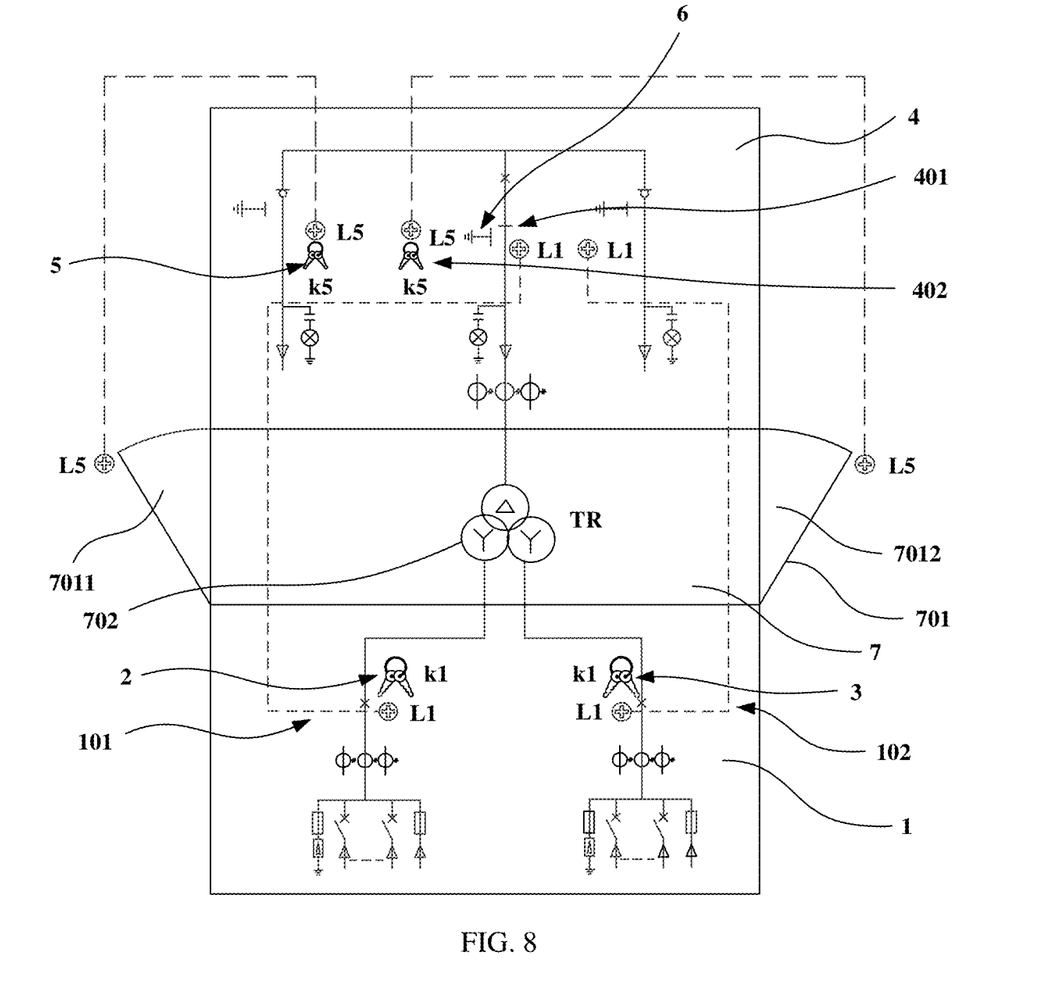
FIG. 8 is another schematic of a structure of a box-type substation according to an embodiment.

For another example, in the box-type substation shown in FIG. 8, the first lock, the second lock, the third lock, and the fourth lock are all locks of a same type, and may be, for example, the first locks L1 shown in FIG. 8, and therefore the first key, the second key, the third key, and the fourth key are all the first keys k1. In addition, the fifth lock, the sixth lock, the seventh lock, and the eighth lock are all locks of a same type, and may be, for example, the fifth locks L5 shown in FIG. 8, and therefore the fifth key, the sixth key, the seventh key, and the eighth key are all fifth keys k5. This can further reduce time for distinguishing and confirming the foregoing keys. In this way, the box-type substation shown in FIG. 8 includes only two types of locks. This can effectively simplify a structure of the box-type substation, simplify maintenance steps of the box-type substation, and improve maintenance efficiency of the box-type substation.

Figure 9:
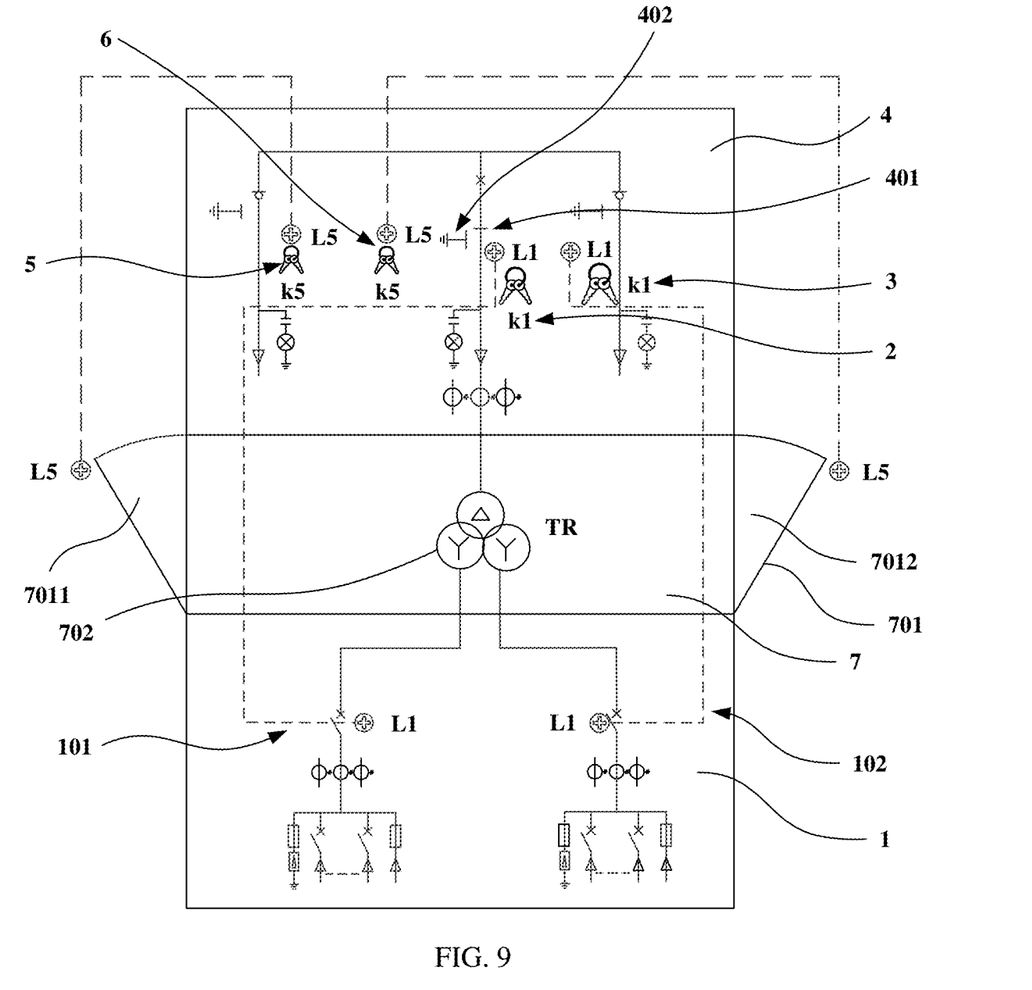
FIG. 9 is another schematic of a structure of a box-type substation according to an embodiment.

When the box-type substation shown in FIG. 8 is unlocked, the two first keys k1 may be pulled out after the two circuit breakers in the low-voltage cabinet 1 are disconnected, and then the two first keys k1 are carried to the high-voltage cabinet 4, and the two first keys k1 are respectively connected to the fifth locks L5 at the disconnector 401, to switch off the disconnector 401. In addition, when the disconnector 401 is in a switched-off state, the two first keys k1 are respectively locked at the corresponding fifth locks L5. In this case, for a structure of the box-type substation, refer to FIG. 9. It should be noted that in a process of switching off the disconnector 401, the two first keys k1 do not need to be distinguished and confirmed. This can reduce time for switching off the disconnector 401.

Figure 10:
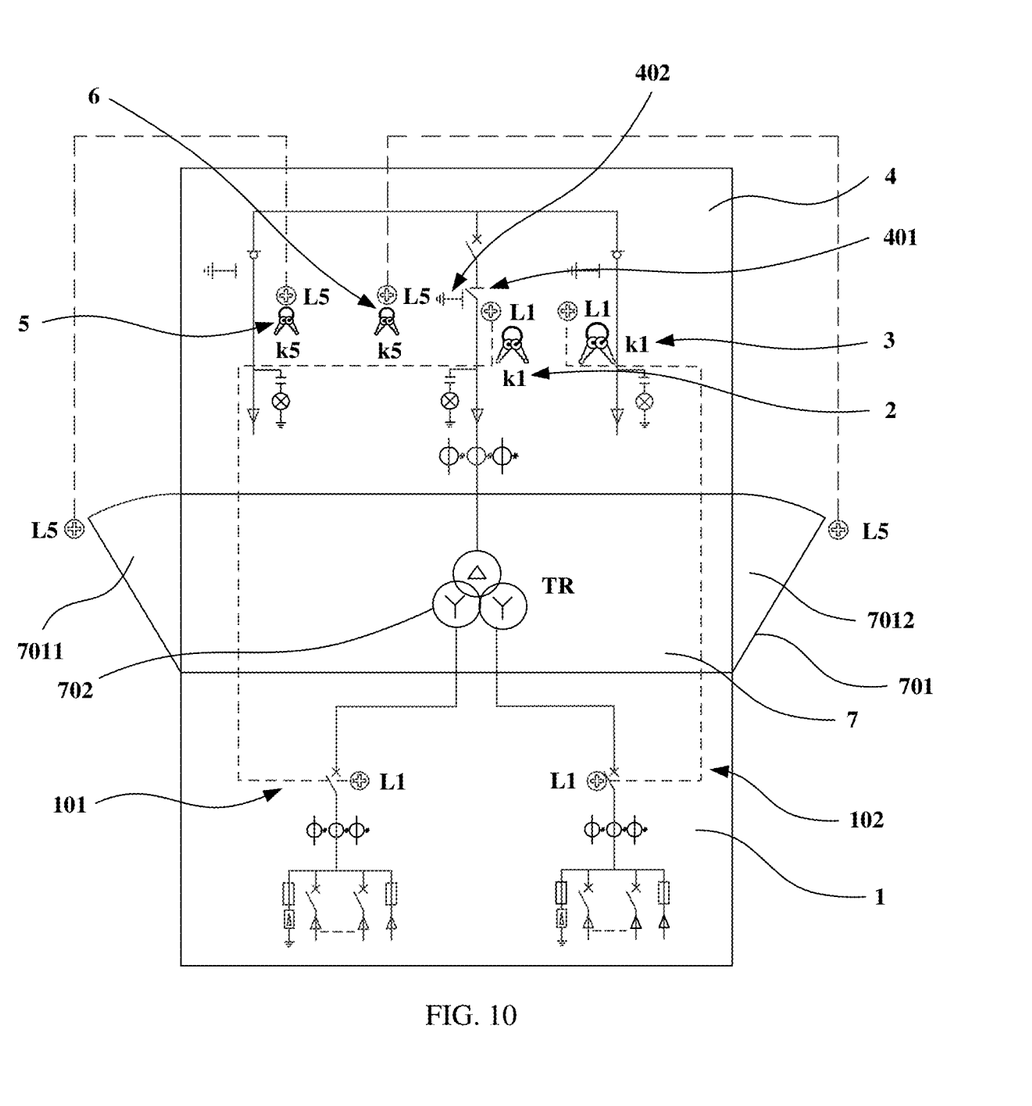
FIG. 10 is another schematic of a structure of a box-type substation according to an embodiment.
Figure 11:
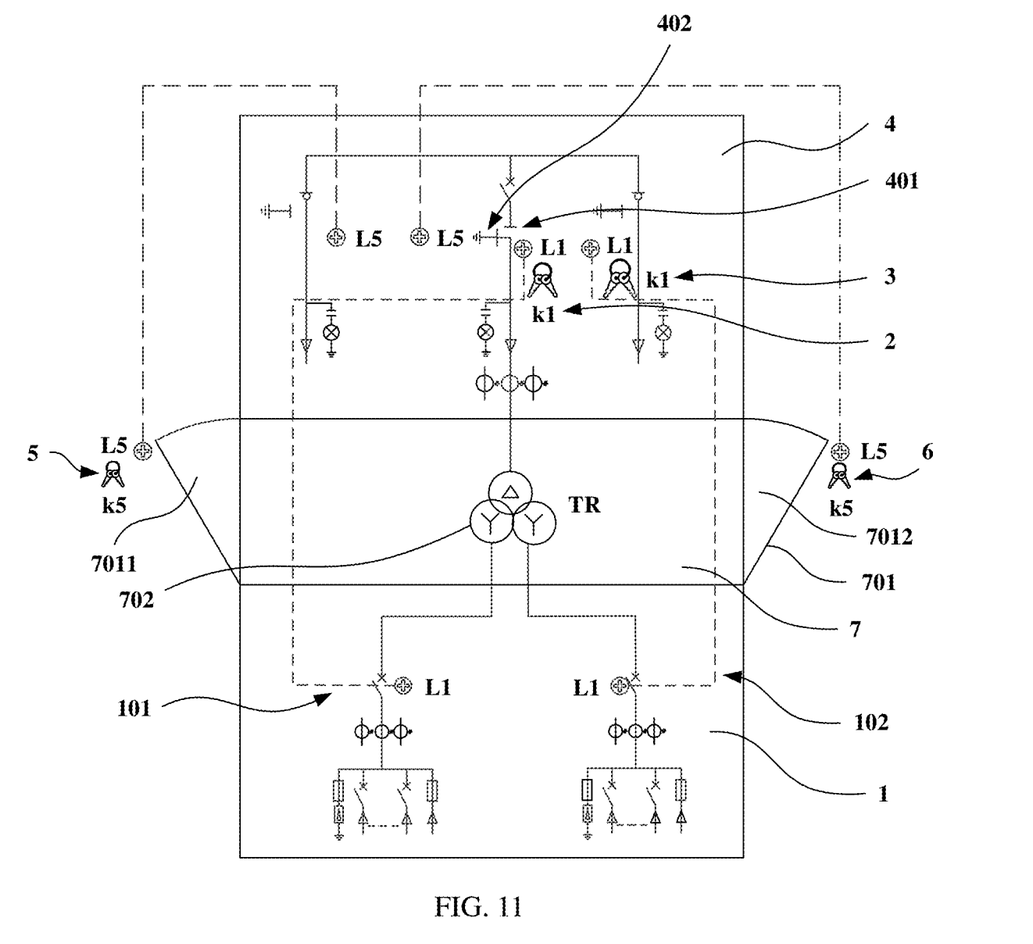
FIG. 11 is another schematic of a structure of a box-type substation according to an embodiment.

After the disconnector 401 is switched off, refer to FIG. 10. FIG. 10 is a schematic of a structure of the disconnector 401 that is of the box-type substation and that is in a switched-off state. Next, the grounding switch 402 may be switched on, so that the two fifth keys k5 at the grounding switch 402 are pulled out. In this case, the two fifth keys k5 may be carried to the transformer room 7, to open the first door 7011 by using any fifth key k5, open the second door 7012 by using the other fifth key k5, and thus open the first door 7011 and/or the second door 7012. In this case, for a structure of the box-type substation, refer to FIG. 11. Therefore, maintenance personnel may perform maintenance on the transformer 702 located in the cabinet body 701 of the transformer room 7. This can effectively ensure safety of maintenance personnel. In addition, after maintenance personnel complete maintenance of the transformer 702, the box-type substation may be re-locked through steps opposite to the foregoing operation steps.

It can be understood from the foregoing descriptions of the process of unlocking the box-type substation shown in FIG. 8 to FIG. 11 that the box-type substation includes only two types of locks. This can effectively simplify a structure of the box-type substation, simplify a process of unlocking the box-type substation, and improve maintenance efficiency of the box-type substation.

The foregoing descriptions are merely specific implementations of the embodiments, but are not intended as limiting. Any variation or replacement readily figured out by a person skilled in the art shall fall within the scope of the embodiments.

What is claimed is:

1. A box-type substation comprising:
   a low-voltage cabinet that comprises a first circuit breaker and a second circuit breaker;
   a high-voltage cabinet that comprises a disconnector;
   a transformer;
   a first keychain configured to switch on or switch off the first circuit breaker; and
   a second keychain configured to switch on or switch off the second circuit breaker, wherein the first circuit breaker is configured to control connection or disconnection between a low-voltage input of the box-type substation and one low-voltage winding of the transformer, the second circuit breaker is configured to control connection or disconnection between the low-voltage input of the box-type substation and the other low-voltage winding of the transformer, and the disconnector is configured to control connection or disconnection between a high-voltage winding of the transformer and an output of the box-type substation;
   when the first circuit breaker is switched on, the first keychain is locked at the first circuit breaker,
   when the second circuit breaker is switched on, the second keychain is locked at the second circuit breaker, and
   when the first circuit breaker and the second circuit breaker are both switched off, the first keychain and the second keychain are configured to simultaneously switch off the disconnector and are both locked at the disconnector.

2. The box-type substation according to claim 1, further comprising:
   a first door;
   a second door;
   a third keychain; and
   a fourth keychain, wherein the high-voltage cabinet further comprises a grounding switch;
   when the disconnector is switched on, the grounding switch is switched off,
   when the disconnector is switched off, the grounding switch is switched on,
   when the grounding switch is switched on, the third keychain is configured to open the first door, and the fourth keychain is configured to open the second door,
   when the first door is in an open state, the third keychain is locked at the first door, and
   when the second door is in an open state, the fourth keychain is locked at the second door.

3. The box-type substation according to claim 2, wherein the first keychain comprises a first key, the second keychain comprises a second key, and the first circuit breaker comprises a first lock, and
   when the first circuit breaker is switched on, the first key is locked at the first lock; and the second circuit breaker comprises a second lock, and
   when the second circuit breaker is switched on, the second key is locked at the second lock.

4. The box-type substation according to claim 3, wherein the disconnector further comprises a third lock and a fourth lock;
   when the disconnector is switched off, the first key is locked at the third lock, and
   when the disconnector is switched off, the second key is locked at the fourth lock.

5. The box-type substation according to claim 3, wherein the disconnector further comprises a third lock and a fourth lock, the first keychain further comprises a third key, and the second keychain further comprises a fourth key;
   when the disconnector is switched off, the third key is locked at the third lock; and
   when the disconnector is switched off, the fourth key is locked at the fourth lock.

6. The box-type substation according to claim 5, wherein the third lock and the fourth lock are locks of a same type, and the third key and the fourth key are keys of a same type.

7. The box-type substation according to claim 1, wherein the first lock and the second lock are locks of a same type, and the first key and the second key are keys of a same type.

8. The box-type substation according to claim 2, wherein the third keychain further comprises a fifth key, the fourth keychain further comprises a sixth key, and the grounding switch further comprises a fifth lock and a sixth lock; and
   when the grounding switch is switched off, the fifth key is locked at the fifth lock, and the sixth key is locked at the sixth lock.

9. The box-type substation according to claim 8, wherein the first door further comprises a seventh lock, and the second door further comprises an eighth lock;
   when the grounding switch is switched on, the fifth key is configured to open the first door and the sixth key is configured to open the second door;
   when the first door is opened, the fifth key is locked at the seventh lock; and
   when the second door is opened, the sixth key is locked at the eighth lock.

10. The box-type substation according to claim 8, wherein the first door further comprises a seventh lock, the second door further comprises an eighth lock, the third keychain further comprises a seventh key, and the fourth keychain further comprises an eighth key;
    when the grounding switch is switched on, the seventh key is configured to open the first door and the eighth key is configured to open the second door;
    when the first door is opened, the seventh key is locked at the seventh lock; and
    when the second door is opened, the eighth key is locked at the eighth lock.

11. The box-type substation according to claim 10, wherein the seventh lock and the eighth lock are locks of a same type, and the seventh key and the eighth key are keys of a same type.

12. The box-type substation according to claim 8, wherein the fifth lock and the sixth lock are locks of a same type, and the fifth key and the sixth key are keys of a same type.

13. An energy storage power supply system, comprising an energy storage apparatus, an energy storage converter, and the box-type substation which comprises
    a low-voltage cabinet that comprises a first circuit breaker and a second circuit breaker;
    a high-voltage cabinet that comprises a disconnector;
    a transformer;

a first keychain configured to switch on or switch off the first circuit breaker; and a second keychain configured to switch on or switch off the second circuit breaker, wherein the first circuit breaker is configured to control connection or disconnection between a low-voltage input of the box-type substation and one low-voltage winding of the transformer, the second circuit breaker is configured to control connection or disconnection between the low-voltage input of the box-type substation and the other low-voltage winding of the transformer, and the disconnector is configured to control connection or disconnection between a high-voltage winding of the transformer and an output of the box-type substation;

when the first circuit breaker is switched on, the first keychain is locked at the first circuit breaker, when the second circuit breaker is switched on, the second keychain is locked at the second circuit breaker, and when the first circuit breaker and the second circuit breaker are both switched off, the first keychain and the second keychain are configured to simultaneously switch off the disconnector and are both locked at the disconnector.

14. The energy storage power supply system of claim 13, wherein the energy storage converter is configured to:
convert a direct current output by the energy storage apparatus into an alternating current; and
output the alternating current to the box-type substation.

15. The energy storage power supply system of claim 13, wherein the energy storage converter is configured to:
convert an alternating current input by the box-type substation into a direct current; and
input the direct current to the energy storage apparatus.

16. The energy storage power supply system of claim 13, wherein the box-type substation is configured to:
perform voltage boosting processing on the alternating current output by the energy storage converter; and
output an alternating current obtained through voltage boosting processing to a power grid.

17. The energy storage power supply system of claim 13, wherein the box-type substation is configured to:
perform voltage decreasing processing on an alternating current input by a power grid; and
input an alternating current obtained through voltage decreasing processing to the energy storage converter.

18. A photovoltaic power generation system, comprising an inverter and the box-type substation which comprises
a low-voltage cabinet that comprises a first circuit breaker and a second circuit breaker;
a high-voltage cabinet that comprises a disconnector;
a transformer,
a first keychain configured to switch on or switch off the first circuit breaker; and
a second keychain configured to switch on or switch off the second circuit breaker, wherein the first circuit breaker is configured to control connection or disconnection between a low-voltage input of the box-type substation and one low-voltage winding of the transformer, the second circuit breaker is configured to control connection or disconnection between the low-voltage input of the box-type substation and the other low-voltage winding of the transformer, and the disconnector is configured to control connection or disconnection between a high-voltage winding of the transformer and an output of the box-type substation;
when the first circuit breaker is switched on, the first keychain is locked at the first circuit breaker,
when the second circuit breaker is switched on, the second keychain is locked at the second circuit breaker,
when the first circuit breaker and the second circuit breaker are both switched off, the first keychain and the second keychain are configured to simultaneously switch off the disconnector and are both locked at the disconnector; wherein the inverter is configured to:
convert a received direct current into an alternating current and output the alternating current to the box-type substation, and the box-type substation is configured to:
perform voltage boosting processing on the alternating current output by the inverter and output an alternating current obtained through voltage boosting processing to a power grid.

\* \* \* \* \*